(12) United States Patent
Khalil et al.

(10) Patent No.: US 8,589,153 B2
(45) Date of Patent: Nov. 19, 2013

(54) ADAPTIVE CONFERENCE COMFORT NOISE

(75) Inventors: Hosam Khalil, Redmond, WA (US);
Xiaoqin Sun, Redmond, WA (US);
Hong Wang Sodoma, Redmond, WA
(US); Warren Lam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 127 days.

(21) Appl. No.: 13/170,567

(22) Filed: Jun. 28, 2011

(65) Prior Publication Data
US 2013/0006622 A1    Jan. 3, 2013

(51) Int. Cl.
*G10L 21/00*    (2013.01)
(52) U.S. Cl.
USPC ..... 704/226; 704/233; 704/215; 704/E19.006
(58) Field of Classification Search
USPC .................... 704/233, 226, 215, E19.006
See application file for complete search history.

(56) References Cited

U.S. PATENT DOCUMENTS

| 5,537,509 | A |   | 7/1996  | Swaminathan et al. |         |
|-----------|---|---|---------|--------------------|---------|
| 5,978,760 | A | * | 11/1999 | Rao et al.         | 704/226 |
| 6,108,623 | A |   | 8/2000  | Morel              |         |
| 6,122,611 | A | * | 9/2000  | Su et al.          | 704/228 |
| 6,711,537 | B1|   | 3/2004  | Beaucoup           |         |
| 6,760,435 | B1| * | 7/2004  | Etter et al.       | 379/406.01 |
| 6,980,528 | B1|   | 12/2005 | LeBlanc et al.     |         |
| 7,012,901 | B2| * | 3/2006  | Jagadeesan et al.  | 370/260 |
| 7,061,934 | B2| * | 6/2006  | El-Maleh et al.    | 370/466 |
| 7,570,937 | B2|   | 8/2009  | Nowlin et al.      |         |

(Continued)

FOREIGN PATENT DOCUMENTS

JP    2000022603 A  *  1/2000

OTHER PUBLICATIONS

Smith, Paxton J., "Voice Conferencing over IP Networks", Retrieved at <<http://citeseerx.ist.psu.edu/viewdoc/download?doi=10.1.1.120.5665&rep=rep1&type=pdf>>, 2002, pp. 140.

(Continued)

*Primary Examiner* — Greg Borsetti
*Assistant Examiner* — Ernest Estes
(74) *Attorney, Agent, or Firm* — Turk IP Law, LLC

(57) ABSTRACT

A continuous comfort noise is provided that is overlaid for the entire duration of a conference call scenario. The comfort noise may be adapted to match the levels of the actual background noise detected on one or more of the conference call participant's devices on the transmitting end(s) of a conference call as well as the participants' speech levels. The comfort noise may also be adapted to the type of listening device employed on the receiving end of a conference call. The comfort noise level may be customized to an appropriate and comfortable level for the type of listening device being used, and the system may continuously mix the comfort noise with incoming audio signals for the entire duration of a conference call, lowering the comfort noise level gradually during speaking periods for additional user experience improvement.

16 Claims, 7 Drawing Sheets

(56) References Cited

U.S. PATENT DOCUMENTS

| | | |
|---|---|---|
| 7,610,197 B2 | 10/2009 | Cruz-Zeno et al. |
| 7,693,708 B2 | 4/2010 | Gournay et al. |
| 8,036,719 B2 * | 10/2011 | Ying .................. 455/574 |
| 2003/0078767 A1 | 4/2003 | Nayak |
| 2005/0038651 A1 * | 2/2005 | Zhang et al. .................. 704/233 |
| 2006/0002527 A1 * | 1/2006 | Takahashi et al. ......... 379/93.09 |
| 2006/0020449 A1 | 1/2006 | Wong et al. |
| 2008/0059161 A1 * | 3/2008 | Khalil et al. .................. 704/226 |
| 2009/0265169 A1 | 10/2009 | Dyba et al. |
| 2010/0056229 A1 * | 3/2010 | Ying .............................. 455/574 |

OTHER PUBLICATIONS

Synnes, et al., "Robust Audio Transport using m-Audio", Retrieved at <<http://media.csee.ltu.se/publications/1999/FR199904.pdf>>, Research Report, 1999, pp. 1-12.

* cited by examiner

ADAPTIVE CONFERENCE COMFORT NOISE

BACKGROUND

Modern communication systems enable a user to communicate with one or more other users simultaneously over a network utilizing a conference scenario feature. During a conference scenario, the participants may use various types of communication devices in order to be able to speak to all of the other participants and to be able to hear when any of the participants speak. In a conference scenario, audio packets may be transmitted over the network to each of the user's listening devices containing the speaking user's speech segments and also containing actual background noise that may be present in each user's local environment. In order to reduce the number of audio packets that are transmitted and to conserve wasted bandwidth, communication systems may employ silence suppressors which reduce the number of packets transmitted when the user is not speaking, and produce silent segments between speaking segments at a listening user's device. The silent segments may be perceived as a disconnection of the conference call, since a listening user may not hear any noise on the client's listening device.

Commonly, a background noise or comfort noise may be generated during the silent segments to prevent the perception of a disconnection. The comfort noise may be hard-fixed to run at a listening user's device at a predefined level and may be initiated upon the detection of an absence of speech and terminated upon the detection of a new speech segment. Typically, the comfort noise level is constant so that it does not sound different after each speech segment and may also be fixed to a low level to avoid sounding too loud for users employing a headset device or handheld device. The fixed comfort noise level may be unpleasant to a listening user due to the jarring transition between speech segments and comfort noise, and the fixed level may not be effective in a wide variety of listening devices, some of which may require higher or lower comfort noise levels depending on their type.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a continuous comfort noise, which may be overlaid for the entire duration of a conference call scenario. The comfort noise may be adapted to match the levels of the actual background noise detected on one or more of the conference call participant's devices on the transmitting end(s) of a conference call as well as the participants' speech levels. The comfort noise may also be adapted to the type of listening device employed on the receiving end of a conference call. The comfort noise level may be customized to an appropriate and comfortable level for the type of listening device being used, and the system may continuously mix the comfort noise with incoming audio signals for the entire duration of a conference call, during both speaking periods and silent periods, at a level lower than the detected level of the speaking level.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
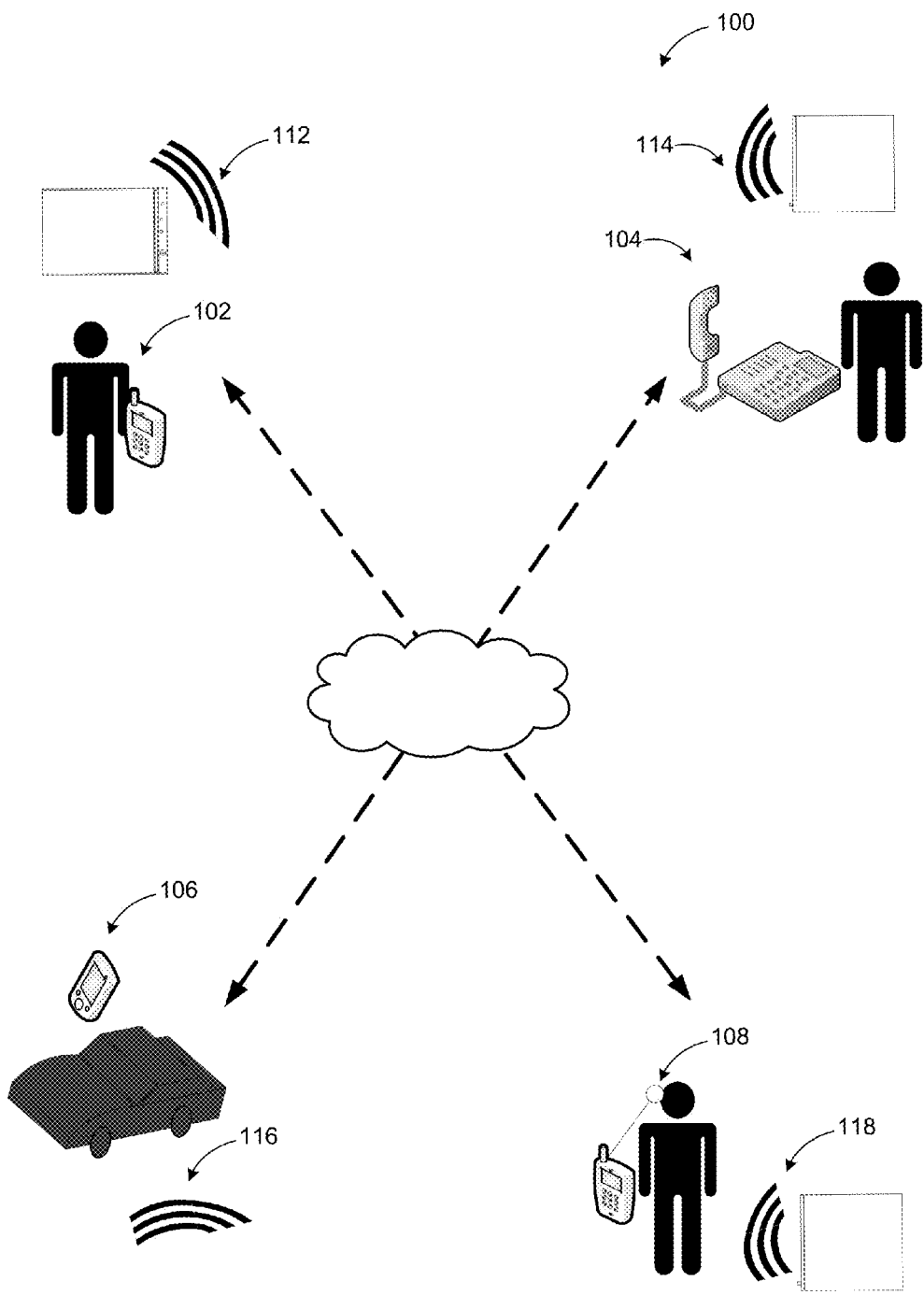
FIG. 1 illustrates an example conference call configuration in an example communication environment.

As briefly described above, a continuous comfort noise may be provided which may be overlaid for the entire duration of a conference call scenario. The comfort noise may be adapted to match the levels of the actual background noise detected on one or more of the conference call participant's devices on the transmitting end(s) of a conference call as well as the participants' speech levels. The comfort noise may also be adapted to the type of listening device employed on the receiving end of a conference call.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing audio/video conference services with noise management. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example communication environment, where two or more users may communicate over a network through various communication or telephony devices. In a communication environment such as the one shown in diagram 100, users may communicate via a variety of communication devices, such as any type of smart phone 102, traditional telephone 104, speaker phone, blue tooth device 106, cellular phone and other computing or telephony devices executing a communication application. A user may initiate a conference call with another user, in which the two users speak to each other over a network. When one user speaks, the speech is transmitted through audio packets from the speaking user's device to the receiving user's communication device. Additionally, a user may initiate a conference call with two or more users, in which multiple users may participate in the conference call, such that all of the users on the conference call may listen and speak to the other users on the call.

Generally in a conference call scenario, when two or more users are communicating with each other using communication devices, the speaking user's voice may be transmitted over the network using audio packets, and the speech segments or talk-spurts may be received at a listening user's device. When the speaking user is silent, the actual background noise from the speaking user's environment may still be transmitted over the network to the receiving user's listening device, resulting in wasted bandwidth for transmitting the background noise signal containing useless audio information. Silence suppression may be applied to reduce the audio packets being transmitted between talk spurts between a speaking user's device and a listening user's device in order to conserve the bandwidth. However, the silence suppression may cause a listening user to perceive a disconnection of the call since the user may not hear any noise between talk-spurts.

In a system according to embodiments, a background comfort noise may be generated at a listening user's device in order to prevent the perception of disconnection between talk-spurts by a speaking user on another communication device during a conference call. The comfort noise may compensate for the silent periods between talk-spurts when no background noise is received at the listener's device from the transmitting device. The system may continuously overlay the comfort noise during the entire duration of a conference call (i.e. during both talk-spurt periods and silent periods). When multiple users are participating in the conference call, the system may detect different actual background noises 112, 114, 116, 118 from each of the user's environments, and the comfort noise may be adapted to match the levels of the actual background noise 112, 114, 116, 118 detected on one or more devices on the transmitting end(s) of a conference call. The comfort noise may also be adapted to the type of listening device on the receiving end of a conference call. For example, a speaker equipped traditional phone 104 or a Bluetooth device 106 in a vehicle may require a higher comfort noise level to be generated while a user employing a headset 108 or smart phone 102 may require a lower level of comfort noise because the headset 108 or smart phone 102 may be more sensitive to higher comfort noise levels.

Figure 2:
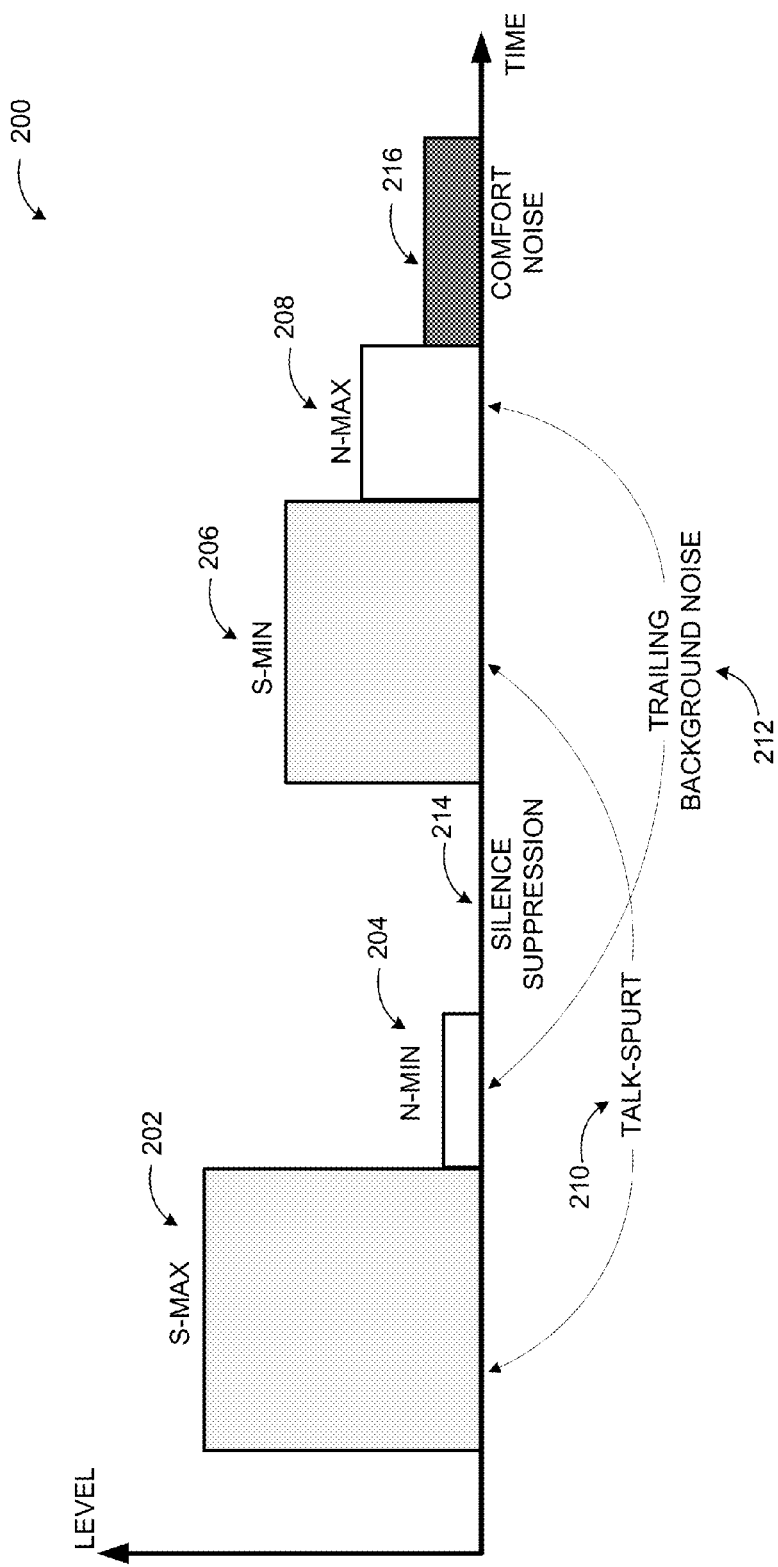
FIG. 2 illustrates an example configuration of detected noise levels in a communication environment, according to embodiments.

FIG. 2 illustrates an example configuration of detected noise levels in a communication environment, according to embodiments. During a standard communication or conference call using telephony devices, users may exchange conversation over a network, and the speaking user's voice may be transmitted over the network using audio packets, and the speech segments, or talk-spurts 210 may be received at a listening user's device. When the speaking user is silent, the actual background noise 212 from the speaking user's environment may also be transmitted over the network to the receiving user's listening device, resulting in wasted bandwidth for transmitting the background noise signal containing useless audio information.

Talk-spurts 210 may include different levels of audio depending on the transmitting devices settings, speaking user's speech level, etc. Thus, in a multi-user conference, the audio level during talk-spurts 210 may range between S-max 202 and S-min 206. Similarly, the background noise levels may also vary from user to user (or depending on the circumstances such as addition of noise from multiple users) between N-max 208 and N-min 204.

Upon recognizing a lack of speech and detecting trailing actual background noise 212, silence suppression may be applied to reduce the audio packets being transmitted between talk spurts 210 generating silence segments 214 between talk-spurts 210. However, silence suppression may cause a listening user to perceive a disconnection of the call since the user may not hear any noise between talk-spurts 210. Additional negative effects of silent segments 214 include that speech may sound choppy and may be difficult to understand, and a sudden change in sound level of the talk-spurts 210 to total silence may be jarring to a listener.

According to some approaches, the silent segments 214 may be replaced by comfort noise 216 generated on the listening user's device to compensate for not receiving background noise from a speaking user so a user may not perceive disconnection. In some scenarios, the comfort noise 216 may be generated only during the silent segments 214, which may result in additional discomfort for a listener due to the discontinuity of switching from talk-spurts 210 to comfort noise 216.

According to embodiments, the comfort noise may be continuously generated on the listener's device during the entire duration of a conference call in order to avoid the discontinuity due to switching from talk-spurts 210 to comfort noise 216. A continuously present comfort noise may maintain the audio quality of the transmitted audio packets for the talk-spurts 210, and avoid the uncomfortable discontinuity of switching between talk-spurts 210, actual background noise 212, silent segments 214, and comfort noise 216.

A client application on a listening user's communication device may determine the device used for listening (e.g., headset, handheld device, speaker device, etc.) and estimate real noise levels in the received signal. The real noise received at the user's device may be either a mix of noise from multiple participants or from a single participant, and the mix can include any number of combinations of noise for the participants. The client application aims to determine the range of noise (N-min and N-max) and differentiate it from speech signals. Thus, the client application may estimate the signal level, in particular S-min, which tracks minimum speech level, and S-max, which tracks the maximum speech level. The client application may then operate a noise generator source that generates noise at level that is a function of the above parameters: Lnoise=f(device, N-min, N-max, S-min, S-max). As mentioned above, the noise may be mixed full-time with the audio, even during speech.

Figure 3:
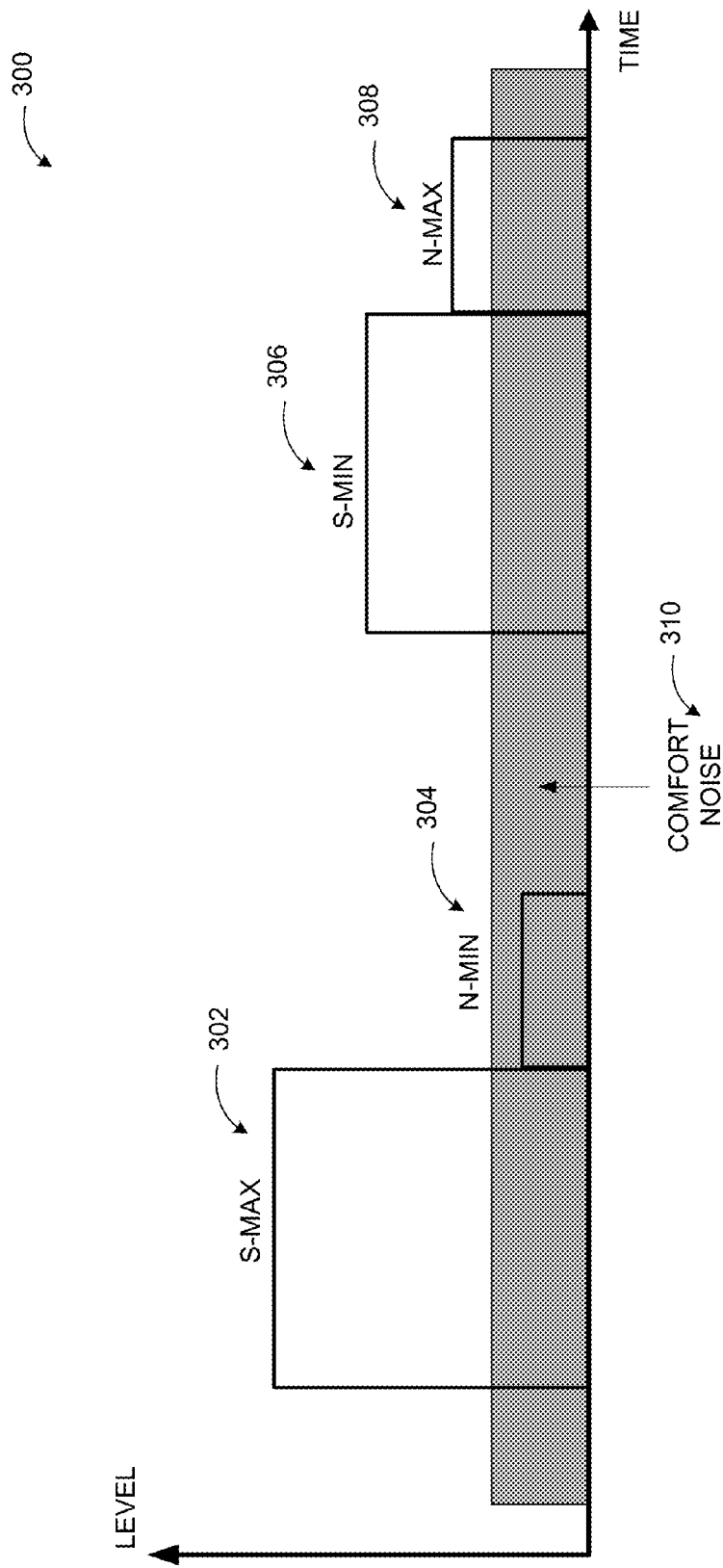
FIG. 3 illustrates an example configuration of noise levels in a communication environment, according to embodiments.

FIG. 3 illustrates an example configuration of noise levels in a communication environment, according to embodiments. During a conference call, in which two or more users may exchange conversation using communication and/or telephony devices, a comfort noise 310 may be generated at a listening user's device and may be mixed with received audio packets of speech and background noise and continuously overlaid during the entire conference call. Upon commencement of the conference call between two or more users, the system may initiate the generation of the background comfort noise 310 with a fixed level to be continuously overlaid during the entire duration of the conference call. By overlaying the fixed level comfort noise 310 for the entire duration of the conference call, a listening user may become accustomed to the comfort noise, and may avoid jarring transitions between talk-spurts, silent periods and comfort noise.

In an example embodiment, the comfort noise level may be customized based on a number of parameters. For example, the comfort noise level may be adapted to the estimated actual background noise levels detected from the each of the various participants on the conference call and the estimated speech levels 302, 306 of the participants (e.g., a mean or average of the different detected noise levels or a weighted average between N-min and N-max). The level of the comfort noise 310 may additionally be adjusted based on the detection of the type of listening device employed by each of the participants. For example, different comfort noise levels may be more appropriate for certain listening devices, such as a speakerphone, Bluetooth device, headset, or handheld device. Some listening devices such as speakerphone or a Bluetooth device in a vehicle may require a higher comfort noise level to be generated in order for a listener to be able to hear the comfort noise over the own listening user's background environmental noise. Other listening devices such as a headset or handheld listening device may require a lower level of comfort noise because the headset or handheld device may be more sensitive to higher comfort noise levels. The system may detect the type of listening device on the receiving end(s) of a conference call, and when generating the comfort noise, the system may adjust the comfort level to meet the most appropriate determined level for the type of listening device.

Each user's actual background noise in the user's environment may be detected and/or estimated, and the received audio signal at the listening user's device may include a range of actual background noise levels during the conference call. The system may operate to determine a maximum actual background noise 308 and a minimum actual background noise 304 from the range of actual background noise levels from the participants in the conference call.

Further, the detected actual background noise levels 304, 308 may be differentiated from the speech signals 302, 306 transmitted by each of the participants in the conference call. The system may detect the transmitted speech levels 302, 306 from the participants in the conference call and may determine a range of speech levels 304, 308 in the received signal at a listening user's device from one or multiple transmitting users on the conference call.

For example, the generated comfort noise 310 may be slightly above the estimated minimum actual background noise level 304 and slightly below the estimated maximum speech signal noise level 302 received at the listener's device, such that the comfort noise 310 does not interfere with the listening user's ability to hear and understand the speech signal from a speaking user. The noise generator may produce a background comfort noise 310 that closely resembles the actual background noise detected from the participant's environments, and may match the frequency and amplitude of the detected actual background noise from the participating users' environments. In an example embodiment, the noise generator may generate Brownian noise as the comfort noise. In other examples, the noise generator may generate white noise or pink noise, or the noise generator may create its own trained noise to match the pattern of actual background noise, or use other known noise profiles for generating the comfort noise to be overlaid during the entire conference call.

Figure 4:
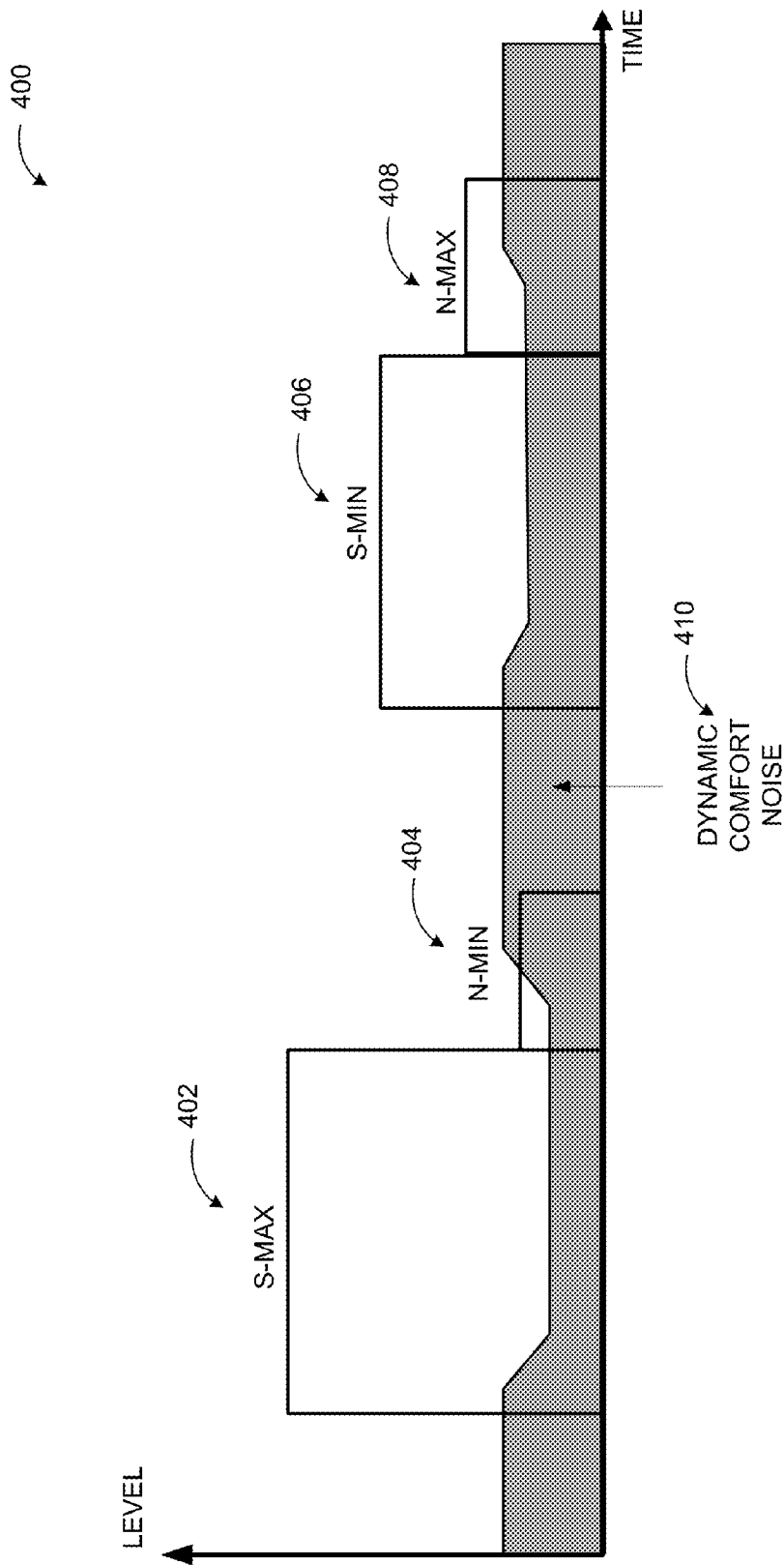
FIG. 4 illustrates an example configuration of dynamic noise levels in a communication environment, according to embodiments.

FIG. 4 illustrates an example configuration of dynamic noise levels in a communication environment, according to embodiments. As demonstrated in diagram 400, a dynamic comfort noise 410 may be generated and overlaid during the entire duration of a conference call. As previously discussed in conjunction with FIG. 3, the comfort noise 410 may be continuously mixed with the speech signals 402, 406 and background noise signals 404, 408 during silent periods received at the listening device. The comfort noise 410 may be a function of the detected noise level parameters, including the maximum actual background noise level N-max, minimum actual background noise level N-min, maximum speech signal level S-max, minimum speech signal level S-min, and type of listening device at the receiving end.

The client application managing the comfort noise during communication sessions may adjust the comfort noise level as a function of the received signal type. For example, the comfort noise level may be reduced gradually during speaking periods and increased gradually during silent periods (when background noise is present). This may enhance speech quality by increasing a signal to noise ratio during speech and reduce an impact of the background noise by masking it substantially with the consistent comfort noise. The gradual change in the comfort noise level (attenuation and ramp-up) may prevent causing a user to feel a sharp contrast in noise levels during the talk-spurts and during the silent segments, while providing a continuous and consistent background noise, which the listeners' ears get used to.

Because the gradual change of the comfort noise depends on the client application detecting talk-spurts and silent periods, there may be a delay in the attenuation and ramp-up as shown in diagram 400.

The example systems in FIG. 1 through 4 have been described with specific devices, applications, and interactions. Embodiments are not limited to systems according to these example configurations. A system for detecting actual background noise levels, speech levels, and type of listening device and providing a continuous comfort noise during a conference call scenario may be implemented in configurations employing fewer or additional components and performing other tasks. Furthermore, specific protocols and/or interfaces may be implemented in a similar manner using the principles described herein.

Figure 5:
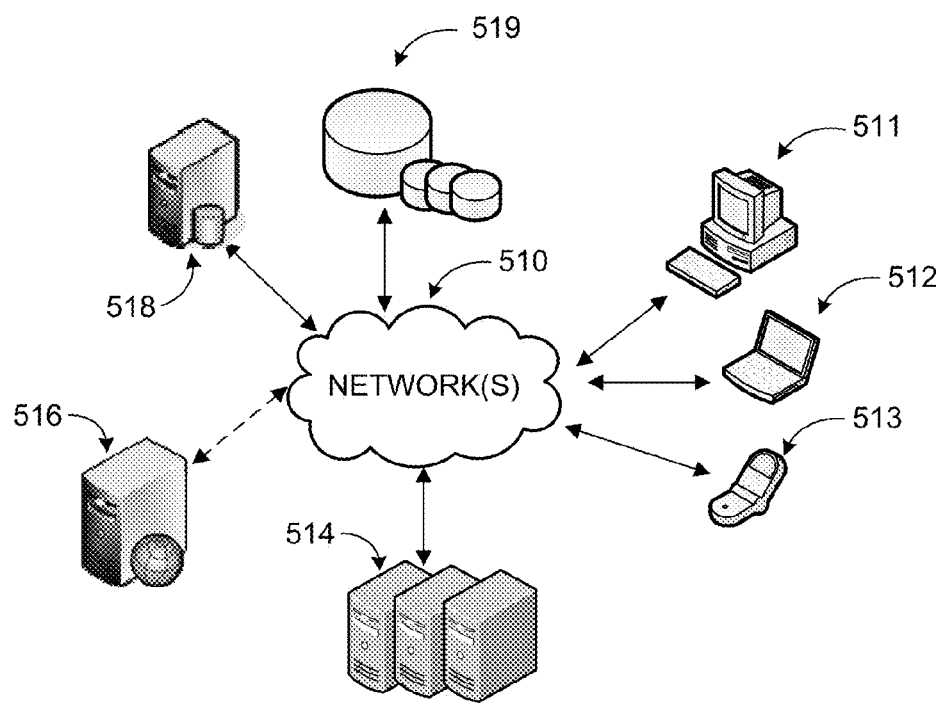
FIG. 5 is a networked environment, where a system according to embodiments may be implemented.

FIG. 5 is an example networked environment, where embodiments may be implemented. A system for detecting actual background noise levels, speech levels, and type of listening device and providing a continuous comfort noise during a conference call scenario may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. An application executed on one of the servers may facilitate the detection of actual background noise, speech levels, and type of listening device employed, and generating a comfort noise to be continuously overlaid during an entire conference call that is a function of the detected parameter levels. The application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform for detecting actual background noise levels, speech levels, and type of listening device and providing a continuous comfort noise during a conference call. Furthermore, the networked environments discussed in FIG. 5 are for illustration purposes only. Embodiments are not limited to the example applications, modules, or processes.

Figure 6:
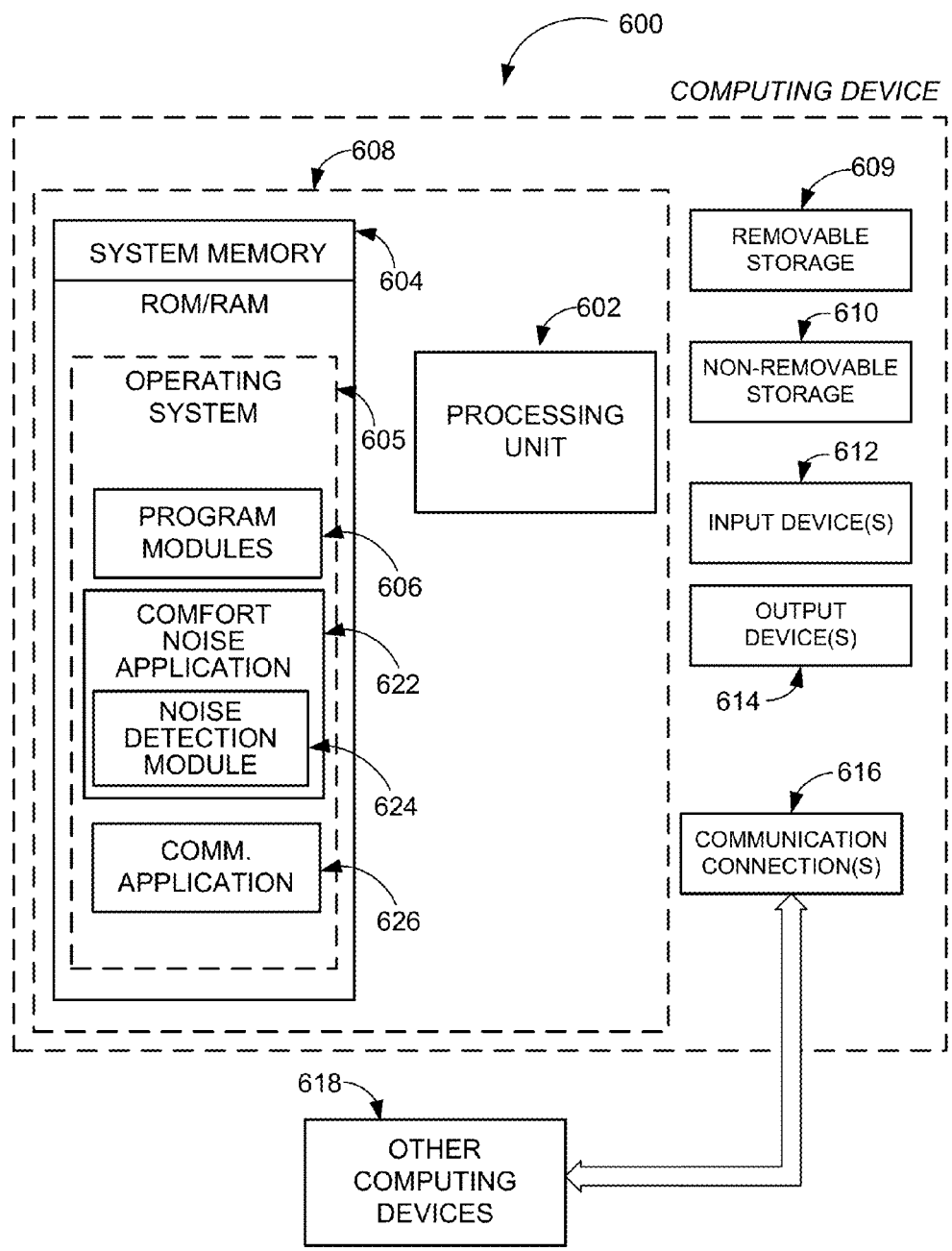
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing a communication application with comfort noise feature according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, comfort noise application 622, noise detection module 624, and communication application 626.

Communication application 626 may facilitate audio, video, and other forms of communication with other devices over one or more networks, which may be susceptible to noise issues as discussed previously. Noise detection module 624 may enable continual detection of transmitted noise levels by one or more participants on a conference call, and estimate the actual background noise present, as well as detect the speech signal levels from each of the participants. Through the noise detection module 624, the comfort noise application 622 may generate a comfort noise to be continuously overlaid for the entire duration of a conference call, which may be a function of the type of listening device on the receiving end, the maximum actual background noise level, minimum actual background noise level, maximum speech level and minimum speech level. Comfort noise application 622 and noise detection module 624 may be separate applications or integrated modules of communication application 626. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
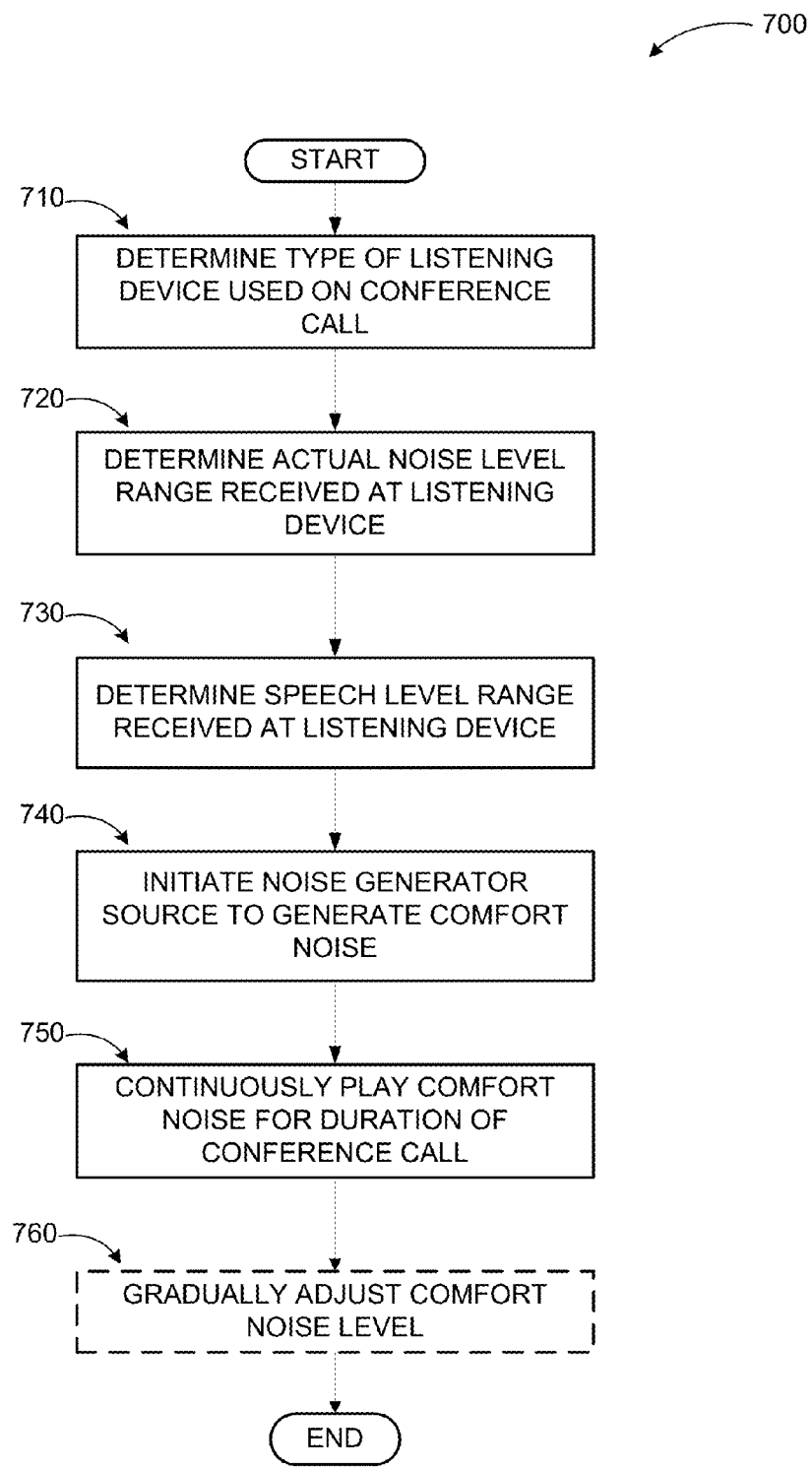
FIG. 7 illustrates a logic flow diagram for a process of providing continuous comfort noise in a communication environment.

FIG. 7 illustrates a logic flow diagram for a process of providing continuous comfort noise in a communication environment. Process 700 may be implemented on a client device communicating with a comfort noise server or a server coupled to a client device.

Process 700 begins with operation 710, where the system determines the type of communication device or listening device that the participants on a conference call may be employing to receive audio packets and hear speech from the other users. At operation 720, the system may detect the actual background noise levels present in the local environments of each of the participants on the conference call. The system may estimate a range of actual background noise levels and may determine a maximum actual background noise level and a minimum actual background noise level that are present in the background environments of the participants of the conference call. At operation 730, the system may detect the speech levels by each of the participants on the conference call. The system may estimate a range of speech levels and may determine a maximum speech level and a minimum speech level by the participants of the conference call.

At operation 740, the system may initiate a noise generator present at the listening user's device to generate a comfort noise. The comfort noise level may be a function of the type of listening device on the receiving end, the maximum actual background noise level, minimum actual background noise level, maximum speech level and minimum speech level. The generated comfort noise may be a created and trained noise by the generator, or the comfort noise may have a known noise profile, such as Brownian noise, white noise, or pink noise, for some examples.

At operation 750, the comfort noise may be continually mixed with the received audio packets and continuously overlaid for the entire duration of the conference call. Optionally, the comfort noise may be attenuated during periods of speech and periods of silence in order to adjust the comfort noise gradually for providing effective and comfortable comfort noise for the listener at operation 760. In some embodiments, the comfort noise may be adjusted in response to an addition or a departure of a participant in the audio communication session. Furthermore, the comfort noise profile may be determined based on level, frequency, and/or phase composition of a combined noise profile of the individual background noise signals.

The operations included in process 700 are for illustration purposes. Detecting actual background noise levels, speech levels, and type of listening device and providing a continuous comfort noise during a conference call scenario may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method at least partially executed on a computing device for providing a continuous comfort noise during audio communication, the method comprising:
   detecting a type of communication device employed by a listening user during an audio communication session;
   detecting speech signal levels from each of a plurality of participants in the audio communication session;
   detecting background noise levels from each of plurality of participants in the audio communication session;
   generating a comfort noise based on the detected device type, speech signal levels, and background noise levels;
   continuously overlaying the comfort noise on the speech signals and background noise signals for the listening user; and
   gradually reducing a level of the comfort noise during speaking periods and gradually increasing the level of the comfort noise during silent periods.

2. The method of claim 1, further comprising:
   determining a maximum speech signal level and a minimum speech signal level based on the detected speech signal levels from the plurality of participants in the audio communication session; and
   computing a range of speech signal levels based on the maximum and minimum speech signal levels.

3. The method of claim 2, further comprising:
   determining a maximum background noise level and a minimum background noise level based on the detected background noise levels from the plurality of participants in the audio communication session; and
   computing a range of background noise levels based on the maximum and minimum background noise levels.

4. The method of claim 3, further comprising:
   generating the comfort noise based on the detected device type, the range of speech signal levels, and the range of background noise levels.

5. The method of claim 4, wherein a level of the comfort noise is determined based on one of: a mean, an average, and a weighted average of the minimum and maximum background noise levels.

6. The method of claim 1, wherein the comfort noise is generated based on at least one of a frequency, a level, and a phase composition of the detected background noise levels.

7. The method of claim 1, wherein a range of the level of the comfort noise is determined based on detected minimum and maximum background noise levels and detected minimum and maximum speech signal levels.

8. The method of claim 1, wherein the generate comfort noise is overlaid on the speech signals and background noise signals during an entire audio communication session.

9. A computing device for providing a continuous comfort noise during audio communication, the computing device comprising:
   a communication module for communicating with other computing devices over a network;
   an audio device for inputting and outputting audio signals;
   a memory; and
   a processor coupled to the memory, the processor executing a noise management application, wherein the noise management application is configured to:
   detect a type of the audio device employed by a listening user during an audio communication session;

detect speech signal levels from each of a plurality of participants in the audio communication session;

detect background noise levels from each of the plurality of participants in the audio communication session;

determine a range of speech signal levels from the detected speech signal levels and a range of background noise levels from the detected background noise levels;

generate a comfort noise based on the detected device type, the range of speech signal levels, the range of background noise levels;

continuously overlay the comfort noise on the speech signals and background noise signals for the listening user during an entire audio communication session; and gradually reduce a level of the comfort noise during speaking periods and gradually increase the level of the comfort noise during silent periods.

10. The computing device of claim 9, wherein the noise management application is further configured to:

determine a combination profile for the detected background noise from all participants; and match a profile of the comfort noise to the combination profile.

11. The computing device of claim 10, wherein the noise management application is further configured to:

train a noise generator to generate the comfort noise to match the combination profile.

12. The computing device of claim 9, wherein the noise management application
is further configured to:

gradually reduce and increase the level of the comfort noise based on at least one from a set of: a type of the audio device, detected minimum and maximum background noise levels, and detected minimum and maximum speech signal levels.

13. The computing device of claim 9, wherein the comfort noise is one of: Brownian noise, white noise, and pink noise.

14. A method for providing a continuous comfort noise during audio communication, the method comprising:

detecting a type of an audio device employed by a listening user during an audio communication session;

detecting speech signal levels from each of a plurality of participants in the audio communication session;

detecting background noise levels from each of the plurality of participants in the audio communication session;

determining minimum and maximum speech signal levels from the detected speech signal levels and minimum and maximum background noise levels from the detected background noise levels;

generating a comfort noise based on the detected device type, the minimum and maximum of speech signal levels, and the minimum and maximum background noise levels; and continuously overlaying the comfort noise on the speech signals and background noise signals for the listening user during an entire audio communication session, wherein a level of the comfort noise is gradually increased and decreased during silent and speaking periods of the audio communication session, respectively.

15. The method of claim 14, further comprising:

determining a profile of the comfort noise based on at least one from a set of: profiles of a plurality of detected background noise signals and one of a mean, an average, and a weighted average of the minimum and maximum background noise levels.

16. The method of claim 14, further comprising:

adjusting the comfort noise in response to one of an addition and a departure of a participant in the audio communication session.

\* \* \* \* \*